(12) United States Patent
Lee

(10) Patent No.: US 6,894,979 B1
(45) Date of Patent: May 17, 2005

(54) NETWORK ANALYZER/SNIFFER WITH MULTIPLE PROTOCOL CAPABILITIES

(75) Inventor: David G. Lee, Austin, TX (US)

(73) Assignee: Crossroads Systems, Inc., Austin, TX (US)

(*) Notice: Subject to any disclaimer, the term of this patent is extended or adjusted under 35 U.S.C. 154(b) by 311 days.

(21) Appl. No.: 09/681,535

(22) Filed: Apr. 24, 2001

(51) Int. Cl.[7] .......................... H04J 3/14; H04L 12/28; H04L 12/56
(52) U.S. Cl. ................. 370/241; 370/401; 370/466
(58) Field of Search .................. 370/401, 402, 370/465, 466, 467, 241–245, 246, 250; 709/230; 714/824

(56) References Cited

U.S. PATENT DOCUMENTS

| | | | | |
|---|---|---|---|---|
| 4,677,611 A | * | 6/1987 | Yanosy et al. | ............ 370/466 |
| 5,539,736 A | * | 7/1996 | Johnson et al. | ............ 370/466 |
| 6,111,893 A | * | 8/2000 | Volftsun et al. | ............ 370/466 |
| 6,137,798 A | * | 10/2000 | Nishihara et al. | ........... 370/392 |
| 6,198,751 B1 | * | 3/2001 | Dorsey et al. | ............ 370/466 |
| 6,272,551 B1 | * | 8/2001 | Martin et al. | ............. 370/466 |
| 2002/0128946 A1 | * | 9/2002 | Chehade et al. | ............. 705/37 |

* cited by examiner

*Primary Examiner*—Chau Nguyen
*Assistant Examiner*—Soon D. Hyun
(74) *Attorney, Agent, or Firm*—Sprinkle IP Law Group

(57) ABSTRACT

Systems and methods for automated testing of multiple-protocol network environments wherein data which is formatted according to a plurality of protocols in sequence is automatically identified and compared to determine whether the data has been correctly transformed from each protocol to the next. An indication of whether the data has been correctly transformed may be presented to a user, along with information about the data itself, such as commands which may be included therein. The information presented to the user is in a user-readable form rather than raw data in order to facilitate analysis of the information by the user.

27 Claims, 9 Drawing Sheets

NETWORK ANALYZER/SNIFFER WITH MULTIPLE PROTOCOL CAPABILITIES

BACKGROUND OF INVENTION

1. Field of the Invention

The invention relates generally to the transfer of data and more particularly to the communication of data across channels which employ multiple data transfer protocols.

2. Background of the Invention

Generally speaking, networks consist of a plurality of interconnected nodes. These nodes may comprise many different types of devices, including, but not limited to, workstations, storage devices, printers, scanners, modems, servers and the like. Networks may also comprise a set of interconnected sub-networks. The interconnection of the sub-networks may be desirable as a means to extend the physical reach of the network, as a means to extend the capabilities of the network, or for various other reasons.

The sub-networks which form a larger network may implement multiple, different protocols for the transfer of data between the devices on the respective sub-networks. Often, the selection of a particular protocol within a sub-network is a result of performance considerations. Because the types of data which are transmitted over different networks (and to the respective devices) may have different characteristics, they may be more efficiently transmitted using different protocols. For instance, a storage area network (SAN) may be efficiently implemented using the fibre channel protocol. This protocol is well-suited to the transfer of large amounts of data to and from storage devices over relatively short distances. It may, however, be less well-suited to the transfer of commands and other information which comprise very small amounts of data compared to the bulk transfers which are typically transferred to storage devices. The fibre channel protocol may also be less well-suited to the transfer of data over very large distances.

Because data may have to be transferred from one sub-network which implements a first protocol to another sub-network which implements a second protocol, it has been necessary to develop devices (e.g., routers) which are capable of receiving data which is formatted according to the first protocol and reformatting the data into the second protocol. It is necessary in the development of these trans-protocol devices to test them and verify that the data is not corrupted when it is reformatted from one protocol to another.

In the prior art, the verification of the reformatted data typically involves the use of a first analyzer which is configured to identify data formatted according to the first protocol, and a second analyzer which is configured to identify data formatted according to the second protocol. Generally, the data which is provided by the analyzers comprises raw data (e.g., hexadecimal values corresponding to the bits which are carried in the packets or frames of the respective protocols.) Accordingly, no means is provided for obtaining packets of data so that they can be further analyzed. The analyzers are normally separate and independent devices. Verification of the translating device's conversion of the data from the first protocol to the second protocol is accomplished by using the first analyzer to identify the raw data which is transferred to the device, using the second analyzer to identify the raw data which is produced by the device, and manually comparing the two to determine whether they are the same. The process of identifying the corresponding values within the input and output data streams and determining whether these values represent the same data can be a tedious, time-consuming and error-prone process.

SUMMARY OF INVENTION

One or more of the problems outlined above may be solved by the various embodiments of the invention. Broadly speaking, the invention comprises systems and methods for automated testing of multiple-protocol network environments. Data which is formatted according to a plurality of protocols in sequence is automatically identified and compared to determine whether the data has been correctly transformed from each protocol to the next. An indication of whether the data has been correctly transformed may be presented to a user, along with information about the data itself, such as commands which may be included therein. The information presented to the user is in a user-readable form rather than raw (e.g., hexadecimal) data in order to facilitate analysis of the information by the user.

In one embodiment, a method comprises identifying data which is to be transmitted to a device according to a first protocol, transmitting the data to the device using the first protocol, receiving corresponding data which is generated by the device and transmitted according to a second protocol, identifying the received data and determining whether the received data matches the initial data. This process may be repeated for a conversion of the data from the second protocol to a third protocol, and for conversions of the data back to previous protocols. An indication is presented to a user to signal the verification (or failure of verification) for the data conversion. The user may also be presented with additional information, such as the commands, embedded data, or other interpretation of the protocol-formatted data to facilitate analysis of potential errors in the conversion. In one embodiment, replies to particular data transfers may be emulated so that debugging or troubleshooting may be performed.

In another embodiment, a system comprises a data processor such as a personal computer which has a plurality of interfaces configured to be coupled to communications channels that implement different data transfer protocols. Data which is transferred over one channel according to a first protocol is converted to a second protocol for transmission over a second channel. Each interface corresponds to a particular one of the data transfer protocols. The interfaces may, for example, comprise interface cards which are configured to be connected to a PCI bus in the computer. The interface cards may be selected to correspond to the protocols of a particular network environment under test. The system is configured to detect data which is transferred over the first channel according to the first protocol, to detect data which is transferred over the second channel according to the second protocol, and to verify that the data formatted according to the second protocol corresponds to the data formatted according to the first protocol. The system thereby automatically verifies the correct conversion from the first protocol to the second. The system may be configured to provide a simple indication that the conversion between protocols was performed correctly, or it may be configured to provide additional information, such as the particular commands embodied in the detected data, or other information relating to the data. This may, in turn, require that the system be configured to interpret the raw data or otherwise convert it to a user-readable form.

BRIEF DESCRIPTION OF DRAWINGS

Other objects and advantages of the invention may become apparent upon reading the following detailed description and upon reference to the accompanying drawings in which.

Figure 1:
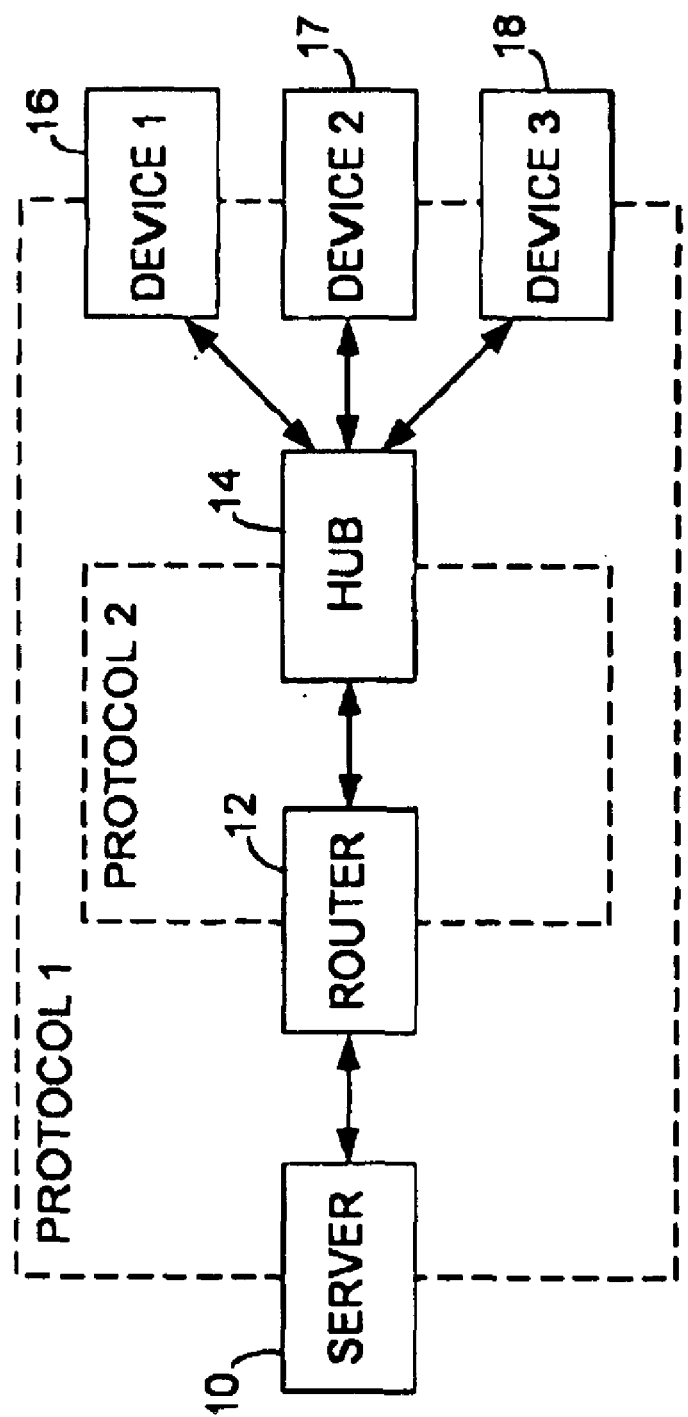
FIG. 1 is a diagram illustrating a network environment in which multiple protocols are used.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for automated testing in multiple-protocol environments. In one embodiment, a method comprises identifying data which is to be transmitted to a device according to a first protocol, transmitting the data to the device using the first protocol, receiving corresponding data which is generated by the device and transmitted according to a second protocol, identifying the received data and determining whether the received data matches the initial data. In one embodiment, after the conversion of the initial data to the second protocol is verified in this manner, the process is repeated for a conversion of the data from the second protocol to a third protocol. The method further comprises providing an indication to a user that the conversion of the data from one protocol to another is either has or has not been verified. Additional information may be presented to the user to facilitate analysis of the conversion. Referring to FIG. 1, a diagram illustrating a network environment in which multiple protocols are used is shown. While specific devices are depicted in this figure, it is intended to be illustrative of generalize network environments which may include any type of network device. In the environment of FIG. 1, data is transferred between a server 10, a router 12, a network hub 14 and several devices 16–18. Data is transferred between server 10 and router 12 using a first protocol. Likewise, data transferred between hub 14 and devices 16–18 are transferred using the first protocol. Data which is transferred between router 12 and hub 14, on the other hand, employs a second protocol. Thus, if it is necessary to transfer data from server 10 to one of devices 16–18, the data must be transferred from server 10 to router 12 according to the first protocol, then it must be converted to the second protocol for transfer from router 12 to hub 14, then it must be converted back to the first protocol before being transferred from hub 14 to devices 16–18.

In an environment such as that depicted in FIG. 1, communications between server 10 and router 12 are typically formatted in accordance with a protocol such as SCSI (Small Computer System Interface). The sub-network which couples router 12 and hub 14 may be a specialized network such as a SAN (storage area network,) which may implement a corresponding protocol, such as Fibre Channel. It is important to not that the particular protocols which are used in a given environment are not important, and that the present systems and methods can be configured to handle any given set of protocols.

Figure 2:
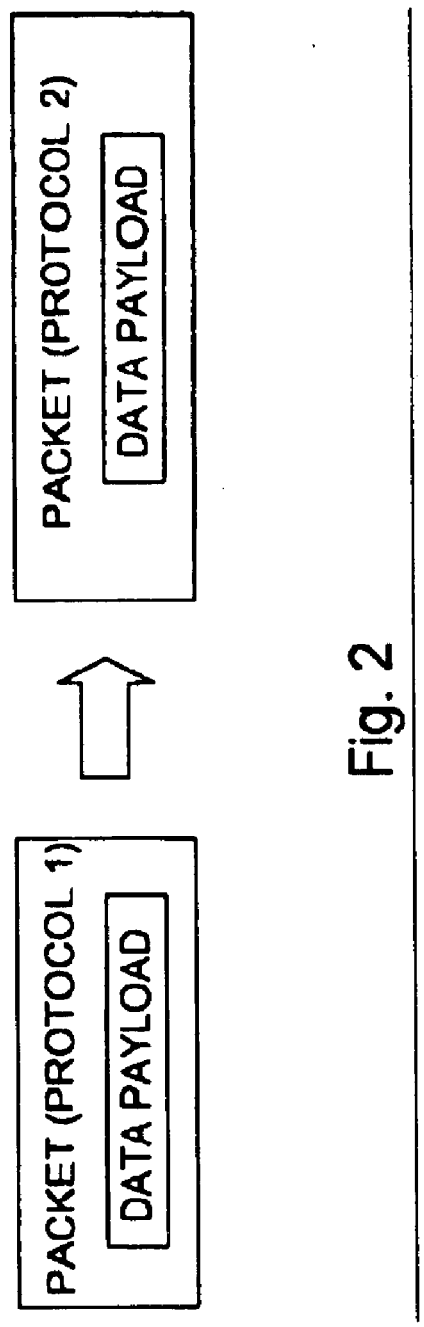
FIG. 2 is a diagram illustrating the translation of data from one protocol to another.

The conversion of the data from one protocol to another may be accomplished in several ways. For example, the data may be effectively translated from one protocol to the other. This is illustrated in FIG. 2. The translation of the data involves identifying the data payload of a packet in the first protocol and then formatting this data into a packet of the second protocol. Thus, the data payloads carried by the packets of the respective protocols will be essentially the same, but the headers and/or other overhead information associated with the packets themselves will be as determined by the respective protocols.

It should be noted that the data which is transported via a particular protocol may be carried in packets, frames or other data structures. For the purposes of this disclosure, all of these structures will be referred to simply as packets. This is not intended to limit the scope of the disclosure, but is intended to simplify and clarify the description of the present systems and methods and to facilitate an understanding thereof.

Figure 3:
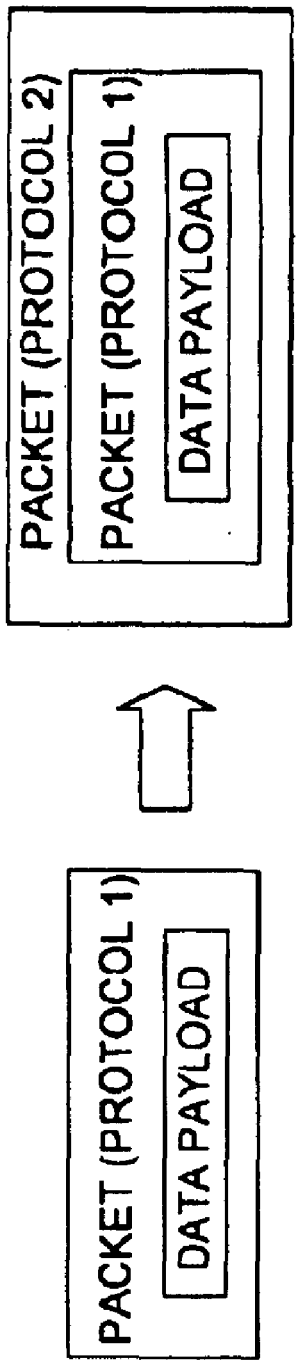
FIG. 3 is a diagram illustrating the encapsulation of data formatted according to one protocol in packets of another protocol.

In another example, the data transmitted according to the first protocol is simply encapsulated. This is illustrated in FIG. 3. In other words, the data, including the data payload and protocol-related overhead information, is treated as the data payload of the packets in the second protocol. The overhead information associated with the first protocol is not discarded. If it is intended in a particular environment to convert data from the first protocol into a second protocol, and then back into the first protocol, it may be desirable to convert the data from the first protocol to the second by encapsulating it. This may improves the efficiency of the conversion back to the first protocol because the data payload is already formatted according to the first protocol—it is not a raw data payload which needs to be reformatted according to the first protocol.

Because the formats of the individual protocols which may be implemented in a given system are well-defined (typically in an industry-accepted specification,) methods for converting data from one protocol to another are well known and easily constructed. These methods may vary from embodiment to embodiment. The particular method which is employed in a given embodiment is not important to the discussion of the present systems and methods and consequently will not be discussed in detail in this disclosure.

Figure 4:
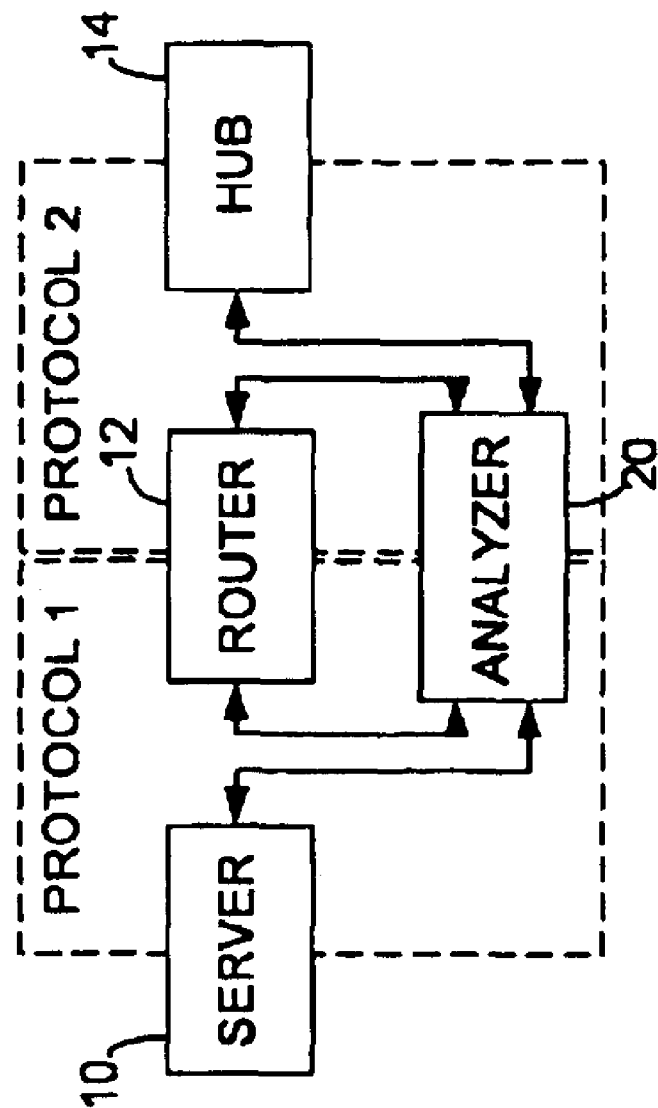
FIG. 4 is a diagram illustrating the physical interconnection of an analyzer according to one embodiment and a data path which is being analyzed.

Referring to FIG. 4, a diagram illustrating the physical interconnection of an analyzer according to one embodiment and a data path which is being analyzed is shown. It should be noted that the network components illustrated in this figure correspond to a subset of those illustrated in FIG. 1. Only a subset of the components is illustrated here in order to simplify the figure. It should be noted that, in the illustrations of the present analyzer and its interconnection with the network components, the flow of data is shown to be bidirectional. While the present systems and methods may have application in simple, unidirectional data flows, the more general case of bidirectional data transfers is illustrated.

FIG. 4 depicts the server 10, router 12 and hub 14 of the system illustrated in FIG. 1. These components are illustrated to depict the conversion of data originally transmitted by server 10 according to protocol 1 into a format which is consistent with protocol 2 so that the data can be received by hub 14. This conversion is performed by router 12.

Analyzer 20 is coupled between server 10 and router 12 so that data transmitted by server 10 under protocol 1 is intercepted by the analyzer. Analyzer 20 is configured to examine the data (as will be described in more detail below) and then transmit the data to router 12. Router 12 is designed to convert data received under protocol 1 into the appropriate format for protocol 2. The data transmitted by router 12 according to protocol 2 is intercepted by analyzer 20, which is configured to examine the data before forwarding it to hub 14.

Analyzer 20 is specifically configured to handle data formatted according to protocol 1. Because it is known that the data received by analyzer 20 from server 10 will be formatted according to this protocol, the data can easily be parsed to identify the data payload carried by the received packets. If the parsing of the data and any subsequent processing cannot be done in real time, it may be desirable to delay the forwarding of the data to router 12. Because the data has been intercepted by analyzer 20, this is easily accomplished. After the analyzer has had sufficient time to process the data, the corresponding packets can be forwarded to the router. In embodiments in which the analyzer is configured to sniff the data rather than intercept it, the analyzer must be able to accept the corresponding data (which is converted by the router and transmitted according to the second protocol) in real time. This obviously allows a limited amount of time for processing data, unless the data can be copied in real time and processed later. (It should be noted that sniff is used herein to describe the detection of data without having to intercept the data and then forward it to its intended destination. For example, test leads which are connected to a channel that directly interconnects two devices may be considered to sniff the data which is transmitted on the channel.) As indicated above, analyzer 20 is also coupled between router 12 and hub 14 to intercept data which is formatted according to protocol 2. Analyzer 20 is again specifically configured to handle data formatted according to this protocol. Just as with protocol 1, analyzer 20 can easily parse the data received from router 12 to identify the corresponding data payload. The data payload received from the router (formatted according to protocol 2) can then be verified against the data payload from which this data was generated (the payload of the protocol 1 packets.) Generally speaking, verifying the data will comprise comparing the data transferred under the respective protocols to determine whether the data was accurately converted from the first protocol to the second. If the data embodied in a second protocol comprises an accurate representation of the data embodied in the first protocol, the data is verified. Verification may, however, be performed in different ways in different embodiments.

It should be noted that the embodiment described above is configured to analyze a network configuration in which data formatted according to protocol 1 is reformatted into protocol 2 by translation. That is, the data payloads must be identified and extracted from the protocol 1 packets so that they can be inserted as the data payloads of the protocol 2 packets. In embodiments which convert data from protocol 1 to protocol 2 by encapsulation, it may not be necessary to parse the packets of protocol 1 and identify their component parts, since the entire protocol 1 packets will be encapsulated as the data payloads of the protocol 2 packets. In this case, the conversion of the data between the two protocols may be verified by extracting the data payloads from the protocol 2 packets and comparing them to the complete protocol 1 packets.

Figure 5:
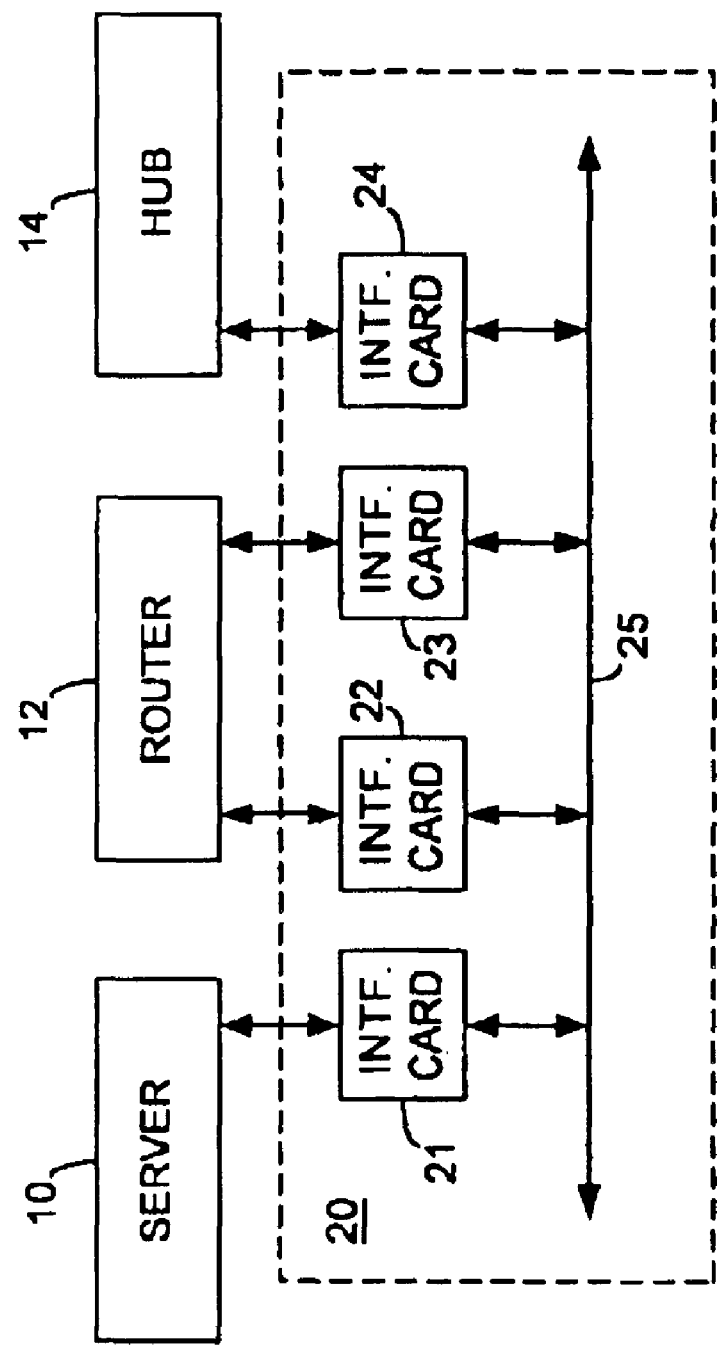
FIG. 5 is a diagram illustrating the interconnection of the analyzer and the network components in one embodiment.

Analyzer 20 can be implemented in a variety of data processing systems. In a preferred embodiment, the analyzer is implemented in a personal computer (PC). The use of a PC facilitates the storage and analysis of the packets after they are detected. (The packets may be stored in the PC's memory, or in an attached storage device.) Referring to FIG. 5, a diagram illustrating the interconnection of the analyzer and the network components in one embodiment is shown. In this embodiment, each of the network components 10, 12, 14 is coupled to analyzer 20 via an interface card 21–24. Each interface card is coupled between a PCI (peripheral component interconnect) bus 25 in the PC and the respective communication channel of the device or network. Each card is configured according to the protocol of the data which will be intercepted via the card. Thus, since server 10 is configured to transmit data to router 12 according to protocol 1, interface cards 21 and 22 are configured according to this protocol. Similarly, because data transmitted between router 12 and hub 14 is formatted according to protocol 2, interface cards 23 and 24 are configured in accordance with protocol 2.

It should be noted that the data processor need not be a PC and may comprise some other type of processor, such as a specialized ASIC. Likewise, the interfaces to the communication channels need not comprise interface cards and may take other forms, such as hard-wired components of the analyzer.

Figure 6:
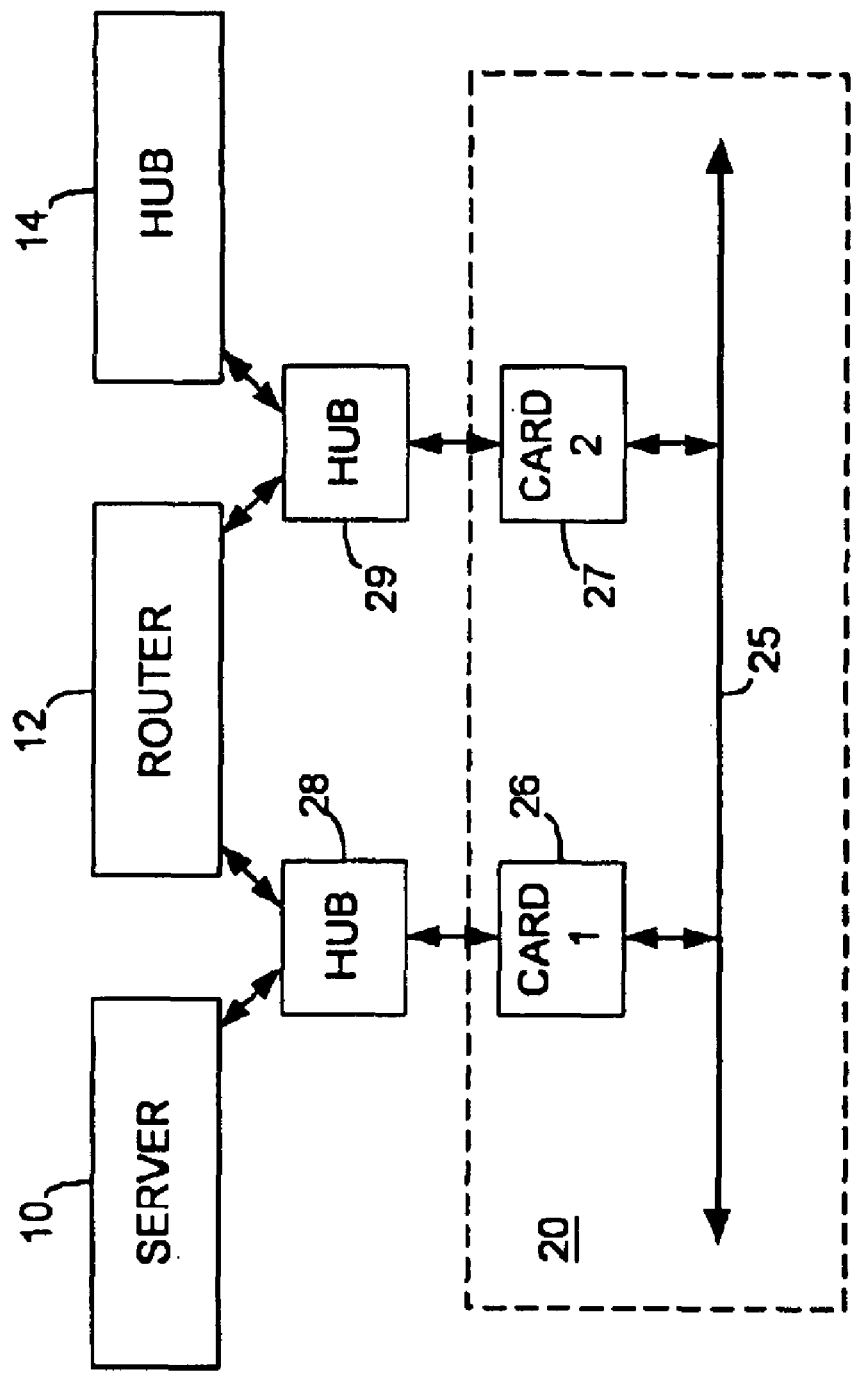
FIG. 6 is a diagram illustrating interconnection of the analyzer and network components in an alternate embodiment.

Referring to FIG. 6, a diagram illustrating interconnection of the analyzer and network components in an alternate embodiment is shown. In this embodiment, network components 10, 12 and 14 are coupled to PCI bus 25 via interface cards 26, 27 and corresponding interface hubs 28, 29. Because the data which is transferred between server 10 and router 12 is all formatted according to the same protocol, it is possible to consolidate the interfaces between analyzer 20 and these network components. This is accomplished by using a single interface card 26 which is configured according to protocol 1, in conjunction with an interface hub 28, which provides a plurality of ports for connection to the network components. The interfaces analyzer 20 between router 12 and hub 14 are likewise consolidated in a single interface card 27 which is coupled to a corresponding interface hub 29. It should be noted that analyzer 20 can be configured to be coupled to additional network components which employ either of these protocols if there are additional ports available on the corresponding interface hubs.

While the embodiments illustrated in FIGS. 4–6 are configured to intercept data which would otherwise be transmitted from server 10 to router 12, and from router 12 to hub 14, it should be noted that other embodiments may be configured to "sniff" the data rather than to intercept it.

Figure 7:
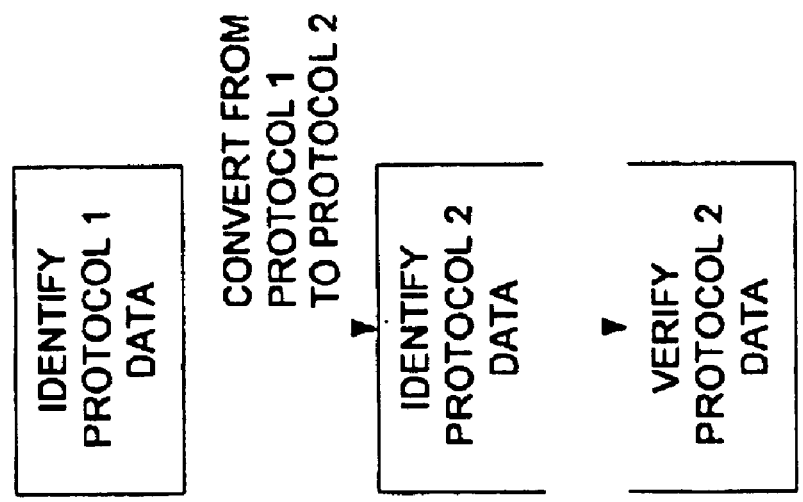
FIG. 7 is a flow diagram illustrating a basic method according to one embodiment.

Referring to FIG. 7, a flow diagram illustrating a basic embodiment of the present invention is shown. This method corresponds roughly to the system described above for verifying the conversion of data from a first protocol to the second protocol. As shown in the figure, data which is formatted according to a first protocol is first identified. The data is then reformatted according to a second protocol. Next, the data, which is now formatted according to the second protocol, is identified. This data is then verified against the data which was originally identified as being transmitted under the first protocol.

It should be noted that the conversion of the data to the second protocol is not depicted as a separate step in FIG. 7 because this embodiment of the present method is contemplated to include the identification of the data carried in the packets of the two protocols and the verification of the data in the second protocol against the data in the first protocol, but not the actual conversion of the data from one protocol to another. Other embodiments may include the step of converting the data from one protocol to another.

The data which is carried in the packets of the two protocols is identified in order to verify that the data has not been corrupted in the conversion from the first protocol to the second. The manner in which the data is identified in the two protocols may vary, depending upon the manner in which the data is converted from the first protocol to the second. If the conversion comprises a translation of the data, identifying the data transmitted according to the first protocol consists of extracting the data payloads of the packets of the first protocol. Identifying the data transmitted according to the second protocol likewise consists of extracting the data payloads of the corresponding packets. The data payloads prior to conversion and subsequent to conversion are then compared to verify that they are the same. If the conversion between protocols comprises encapsulation, identifying the data transmitted according to the first protocol consists simply of identifying the packets of the first protocol. Identifying the data transmitted according to the second protocol, on the other hand, consists of extracting the data payloads of the packets of this protocol (which consist of the packets of the first protocol.) The data, in the form of the packets of the first protocol, is then compared in its pre-conversion and post-conversion forms to verify that they are the same.

While the method illustrated in FIG. 7 comprises a very basic embodiment, other embodiments of the present methods may be more complex. For example, they may include such steps as the interception of packets of the first protocol, the generation of packets of the first protocol, the conversion of these packets into the format of the second protocol, specific methods for comparing the data payloads carried under the respective protocols, the analysis of identified errors, the analysis of stored packets, the presentation of various types of data to a user and various other steps. Such variations and modifications of the basic embodiment illustrated in FIG. 7 are contemplated to be within the abilities of a person of ordinary skill in the data processing arts, and consequently within the scope of this disclosure.

Figure 8:
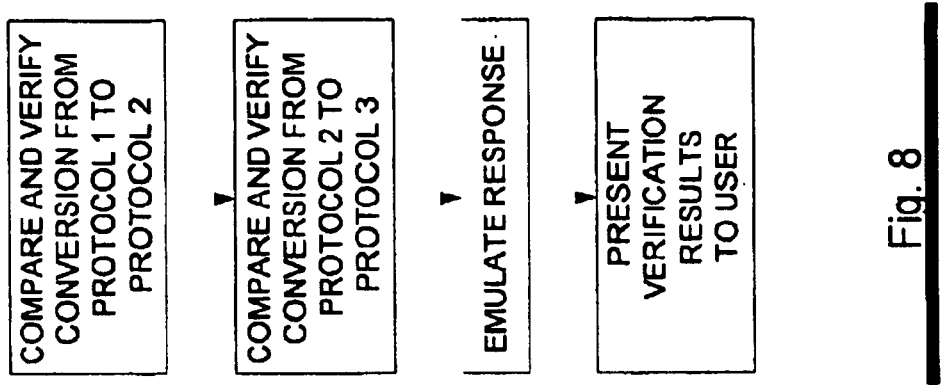
FIG. 8 is a flow diagram illustrating a method according to an alternative embodiment.

Referring to FIG. 8, a flow diagram illustrating another embodiment of the present method is shown. This embodiment is configured for use in an environment in which data is converted from a first protocol to a second, and then to a third. In this embodiment, data which has been converted to the second protocol from the first protocol is compared against the first protocol to verify the conversion. The conversion of the data from the second protocol to the third protocol is then verified by comparing the respective data. In this embodiment, a response to the converted data is emulated and transmitted back to the originator of the initial data. The verification results (e.g., verification confirmation and information related to the converted data) are then presented to a user for analysis.

It should be noted that some embodiments of the present systems and methods may include the emulation of responses to certain data that is transferred through the network environment which is being tested and analyzed. For example, if the data which is originally transmitted through the network environment comprises a request to a server, the system may emulate replies which might be expected if the server were operating properly. Alternatively, the system might emulate error messages or replies that could be expected if the server were not operating properly. The system may also be configured to analyze the behavior of the network environment in response to the emulated replies and to present information regarding the analysis to the user.

In a preferred embodiment of the present system, the user is presented with an indication of whether the data conversion between the two protocols has been verified. While prior art data analyzers are normally configured to display raw data values to the user, this system is configured to interpret the data and to present to the user information which can be more conveniently used. For example, the system may be configured to present a display to the user that clearly states that the data conversion either has or has not been verified. This display may comprise a simple pass/fail indication, or it may be more detailed. If the conversion is not verified, the system may be configured to select particular packets which were not properly converted and to display them to the user so that he or she can troubleshoot the tested system. The system may also be configured to identify commands or other information which may be embodied in the packets of the respective protocols and to display them to the user so that user can analyze problems without having to be familiar with the raw (e.g., hexadecimal) data values that represent the commands. While the foregoing description focuses on conversions from a first protocol to a second protocol, it should be noted that the present systems and methods are applicable to conversions from the first protocol to the second, and then back to the first. For instance, FIG. 1 shows a network environment in which data is converted from protocol 1 to protocol 2, then back to protocol 1 (before delivery to devices 16–18.) As noted above, the conversion from protocol 2 back to protocol 1 was not described above for the sake of simplicity.

Figure 9:
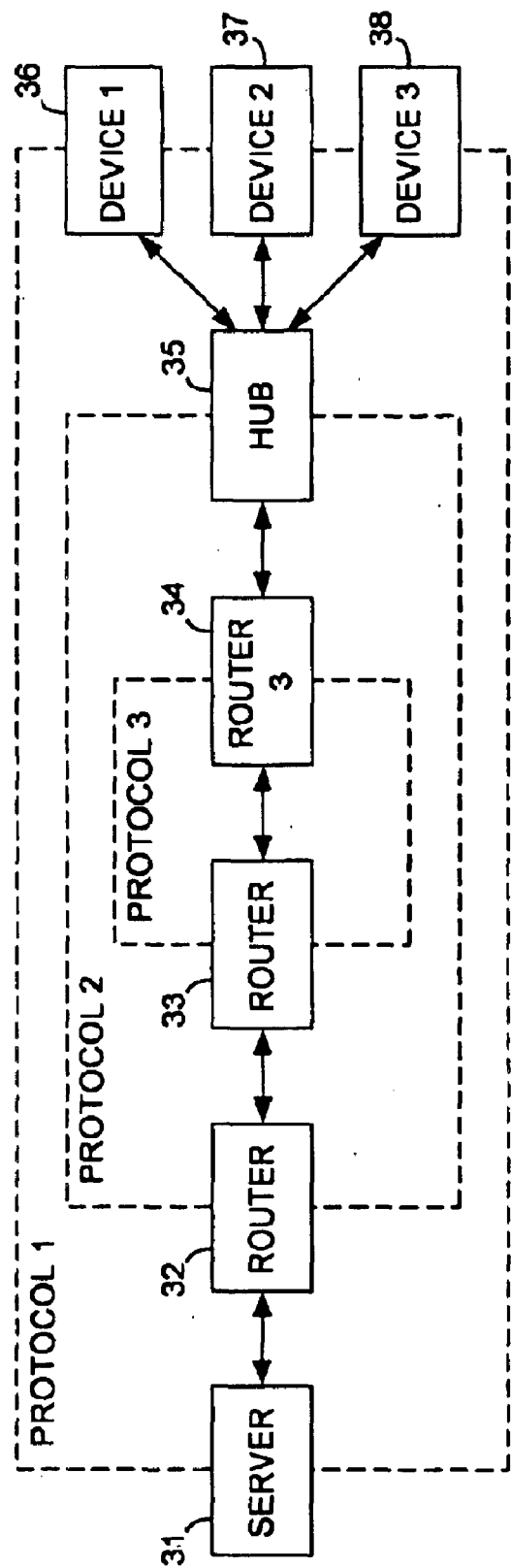
FIG. 9 is a diagram illustrating a network environment in which three protocols are implemented.

Further, the present systems and methods are applicable to conversions between more than two protocols. One example of this can be seen in FIG. 9. This figure illustrates a network environment in which three protocols are implemented. In this network environment, protocol 1 is employed between server 31 and router 32 and between hub 35 and devices 36–38. Protocol 2 is employed between router 32 and router 33, and between router 34 and hub 35. Finally, protocol 3 is employed between router 33 and router 34. This type of network environment may be useful when, for example, protocol 1 is well-suited for local communications (e.g., between server 31 and router 32 and between hub 35 and devices 36–38,) protocol 2 is well-suited for communications within a specialized network (such as a SAN coupling router 32 to router 33, and coupling router 34 to hub 35,) and protocol 3 is well-suited for long-distance communications (e.g., if router 33 and router 34 and located at a great distance for each other.) The scalability of the present systems and methods are not limited, except by the hardware selected for a particular embodiment. For example, if an embodiment uses a PC which has only a limited number of slots that can accept interface cards, the system can only accommodate that number of protocols. If additional slots are made available through the use of a bus extender or other means, then more protocols may be accommodated. The system is also easily reconfigurable. If the system is initially configured to verify conversions from a first protocol to a second protocol, it may be reconfigured to verify conversions from the first protocol to a third protocol, or between third and fourth protocols, by replacing the interface cards (or equivalent interface hardware) with cards designed for the new protocols.

While the present invention has been described with reference to particular embodiments, it should be understood that these embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for analyzing the transfer of data across communication channels utilizing different protocols comprising:

a data processor; and a plurality of communication channel interfaces coupled to the data processor;

wherein the data processor is configured to receive data formatted according to a first protocol via a first one of the interfaces, to identify the data formatted according to the first protocol, to receive data formatted according to a second protocol via a second one of the interfaces, to identify the data formatted according to the second protocol to verify that the data formatted according to the second protocol corresponds to the data formatted according to the first protocol, and to verify that the data formatted according to the second protocol corresponds to the data formatted according to the first protocol by comparing a data payload of the data formatted according to the second protocol and a data payload of the data formatted according to the first protocol to determine whether the data payload of the data formatted according to the second protocol is identical to the data payload of the data formatted according to the first protocol.

2. A method comprising:

accepting data formatted according to a first protocol, identifying a data payload of data formatted according to the first protocol, forwarding the data formatted according to the first protocol to a first device which is configured to convert the data payload of the data formatted according to the first protocol from the first protocol to the second protocol, converting the data payload of the data formatted according to the first protocol to a second protocol, identifying the data payload of the data formatted according to the second protocol, verifying the integrity of the data formatted according to the second protocol, accepting data formatted according to the second protocol from the first device, identifying the data payload of the data formatted according to the second protocol, and verifying that the data payload of the data formatted according to the second protocol is identical to the data payload of the data formatted according to the first protocol.

3. The method of claim 2 further comprising forwarding the data formatted according to the second protocol to a second device which is configured to convert the data payload of the data formatted according to the second protocol from a second protocol to a third protocol.

4. The method of claim 3 further comprising accepting data formatted according to the third protocol from the second device, identifying the data payload of the data formatted according to the third protocol, and verifying that the data payload of the data formatted according to the third protocol is identical to the data payload of the data formatted according to the second protocol.

5. The method of claim 4 further comprising forwarding the data formatted according to the third protocol to a third device.

6. The system of claim 1 wherein the data processor is further configured to present to a user an indication of whether the data formatted according to the second protocol corresponds to the data formatted according to the first protocol.

7. The system of claim 1 wherein the data processor comprises a personal computer (PC).

8. The system of claim 7 wherein the PC comprises a peripheral component interconnect (PCI) bus, and wherein the plurality of interfaces comprise a plurality of interface cards which are coupled to the PCI bus.

9. The system of claim 1 wherein the data processor is further configured to receive data formatted according to a third protocol via one of the interfaces, to identify the data formatted according to the third protocol, and to verify that the data formatted according to the third protocol corresponds to the data formatted according to the first or second protocols.

10. The system of claim 1 wherein the data processor is configured to emulate a response to the data formatted according to the second protocol.

11. The system of claim 10 wherein the response comprises an indication of an error.

12. The system of claim 1 wherein the data processor is configured to decode at least a portion of the data formatted according to the first or second protocols, to interpret the portion of the data, and to display the interpretation to a user.

13. The system of claim 1 wherein the data processor is configured to verify that the data formatted according to the second protocol corresponds to the data formatted according to the first protocol automatically.

14. The system of claim 1 further comprising a data storage unit, wherein the system is configured to store one or more of the analyzed data packets.

15. The system of claim 14 wherein the data processor is configured to perform one or more analyses on the stored data packets.

16. The method of claim 2 further comprising: converting the data payload to a third protocol; identifying a data payload of the data formatted according to the third protocol; and verifying the integrity of the data payload of the data formatted according to the third protocol.

17. The method of claim 2 wherein converting the data payload to the second protocol comprises translating the data payload from the first protocol to the second protocol.

18. The method of claim 2 wherein converting the data payload to the second protocol comprises encapsulating the data payload formatted according to the first protocol in a format according to the second protocol.

19. The method of claim 3 further comprising: converting the data payload to a third protocol; identifying a data payload of the data formatted according to the third protocol; and verifying the integrity of the data payload of the data formatted according to the third protocol.

20. The method of claim 3 wherein converting the data payload to the second protocol comprises translating the data payload from the first protocol to the second protocol.

21. The method of claim 3 wherein converting the data payload to the second protocol comprises encapsulating the data payload formatted according to the first protocol in a format according to the second protocol.

22. The method of claim 4 further comprising: converting the data payload to a third protocol; identifying a data payload of the data formatted according to the third protocol; and verifying the integrity of the data payload of the data formatted according to the third protocol.

23. The method of claim 4 wherein converting the data payload to the second protocol comprises translating the data payload from the first protocol to the second protocol.

24. The method of claim 4 wherein converting the data payload to the second protocol comprises encapsulating the data payload formatted according to the first protocol in a format according to the second protocol.

25. The method of claim 5 further comprising: converting the data payload to a third protocol; identifying a data payload of the data formatted according to the third protocol; and verifying the integrity of the data payload of the data formatted according to the third protocol.

26. The method of claim 5 wherein converting the data payload to the second protocol comprises translating the data payload from the first protocol to the second protocol.

27. The method of claim 5 wherein converting the data payload to the second protocol comprises encapsulating the data payload formatted according to the first protocol in a format according to the second protocol.

* * * * *